United States Patent [19]
Kraft

[11] 4,276,038
[45] Jun. 30, 1981

[54] HYDRAULIC BELT TENSIONER CONSTRUCTION

[75] Inventor: Derald H. Kraft, Canton, Ohio

[73] Assignee: Dyneer Corporation, Canton, Ohio

[21] Appl. No.: 60,903

[22] Filed: Jul. 26, 1979

[51] Int. Cl.³ .............................................. F16H 7/12
[52] U.S. Cl. .................................................... 474/110
[58] Field of Search ...................... 74/242.1FP, 242.11, 74/242.8; 91/432, 46, 533, 447; 92/65, 151, 152

[56] References Cited

U.S. PATENT DOCUMENTS

| | | | |
|---|---|---|---|
| 2,051,488 | 8/1936 | Kottlowski | 74/242.11 R |
| 2,703,019 | 3/1955 | Burawoy | 74/242.11 A |
| 2,893,255 | 7/1959 | Bayliss | 74/242.8 |
| 3,132,596 | 5/1964 | Dinger | 417/212 |
| 3,142,193 | 7/1964 | Polko et al. | 74/242.11 R |
| 3,413,866 | 12/1968 | Ford | 74/242.11 R |
| 3,483,763 | 12/1969 | Enters | 74/242.15 R X |
| 3,631,734 | 1/1972 | Wagner | 74/242.11 R |
| 3,752,040 | 8/1973 | Pawloski | 91/533 |
| 3,768,324 | 10/1973 | Vanderstegen-Drake | 74/242.15 R |
| 3,785,220 | 1/1975 | Jacobs | 74/242.1 FP |
| 3,812,733 | 5/1974 | Yoshida | 74/242.11 S |
| 3,924,483 | 12/1975 | Walker et al. | 74/242.11 R |
| 3,965,768 | 6/1976 | Foster | 74/242.15 R |
| 3,975,965 | 8/1976 | Speer | 74/242.15 R |
| 4,077,272 | 3/1978 | Busso | 74/242.1 FP |
| 4,144,772 | 3/1979 | Brackin et al. | 74/242.15 R |

FOREIGN PATENT DOCUMENTS 336737  10/1930  United Kingdom ............. 74/242.1 FP

*Primary Examiner*—C. J. Husar
*Assistant Examiner*—Conrad Berman
*Attorney, Agent, or Firm*—Frease & Bishop

[57] ABSTRACT

A hydraulic tensioning device for maintaining a predetermined amount of tensioning force on an endless drive belt for the vehicle accessories drive system. A hydraulic cylinder is adapted to be mounted in a fixed position with respect to the vehicle engine and is operatively connected to the low-pressure hydraulic fluid system of the engine. A bellcrank mechanism is pivotally mounted on the cylinder and has a belt-engaging idler pulley rotatably mounted on an extended end of one of the levers. The other lever is operatively engaged by the cylinder piston which moves the idler pulley into tensioning engagement with the drive belt. The cylinder has a plurality of discs mounted in a spaced relationship on the piston rod for imparting movement to the rod when acted upon by hydraulic fluid. Each disc forms a movable forward wall of a separate hydraulic subchamber located within the cylinder. A hollow bore is formed in the rear portion of the piston rod to provide a fluid passage between the spaced subchambers. The discs and associated subchambers enable a sufficiently large force to be exerted on the piston rod for actuation of the bellcrank from the low pressure of the engine lubricating system. A check valve is provided in the incoming hydraulic fluid passage of the cylinder and keeps those portions of each cylinder subchambers which are located behind the piston discs filled with hydraulic fluid to maintain a constant predetermined tensioning force on the belt without regard to the operating condition of the engine, and to provide a shock-absorbing damping action for the idler pulley.

14 Claims, 6 Drawing Figures

HYDRAULIC BELT TENSIONER CONSTRUCTION

BACKGROUND OF THE INVENTION

1. Field of the Invention

The invention relates to belt tensioning devices, and in particular to hydraulically actuated belt tensioning devices for use with the endless drive belts of the drive systems for vehicle accessories. More particularly, the invention relates to a belt tensioner operable from the low-pressure lubricating system of the vehicle engine, which maintains a predetermined constant tensioning force on the endless drive belt regardless of whether the engine is on or off, and which provides a shock-absorbing damping action on the tensioner.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To insure optimum operating efficiency for these various accessories, it is necessary that the drive belt be maintained at a predetermined tension to assure efficient performance of the accessories as well as satisfactory service life for the belt. Due to the relatively greater length of the single drive belt which replaces the heretofore plurality of smaller belts, there is a greater tendency for the belt to stretch, which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use springs for applying and maintaining the tensioning force on a belt-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733, 3,924,483 and 3,965,768. Some of these various spring-actuated devices use the biasing force of the spring in combination with hydraulic-actuated members for regulating the amount of tensioning force applied to the belt, depending on whether the engine is running or shut off.

U.S. Pat. No. 2,051,488 shows a chain tensioning device in which a hydraulic cylinder is actuated when the engine is running to reduce the tensioning pressure which is exerted on the drive chain by a biasing spring. This hydraulic cylinder applies a counter force to the biasing action of the spring when the engine is running in order to decrease the tensioning force on the chain, whereupon the full biasing force of the spring is exerted on the chain when the engine is off and the hydraulic cylinder inactive. U.S. Pat. No. 3,142,193 discloses another belt tensioner using a hydraulically actuated bellcrank and belt-engaging pulley in which a spring biases the pulley into tensioning engagement with the belt until the engine is operating, whereupon the hydraulic-actuated piston imparts a greater tensioning force to the pulley through the bellcrank. When the engine stops, the piston retracts and the spring maintains a lesser tensioning force on the belt. U.S. Pat. No. 4,077,272 discloses another belt tensioner using both a spring and a hydraulic member to achieve the desired tensioning characteristics. In this device, when the engine is running, hydraulic oil from the engine lubricating system forces a piston back into its cylinder to overcome an internally mounted first spring so that only a second spring acts on the belt tensioning pulley when the engine is operating. When the engine is off, both springs acts on the belt tensioning pulley. U.S. Pat. No. 3,132,596 shows a belt tensioner using a hydrostatic snubber controlled by the power steering pump of the vehicle, whereupon the snubber is forced outwardly in direct relationship to the output pressure of the power steering pump. This mechanism does not maintain a constant pressure on the belt when the vehicle engine is both on and off, and will apply different forces in relationship to the engine speed.

Many of these devices are believed to perform satisfactorily for their intended purpose, but it is preferred that the use of springs for effecting the tensioning force on a drive belt or chain, either for applying or retracting a tensioning member therefrom, presents problems. The operating characteristics of these springs will change over the life of the spring and even in response to changes in ambient temperature. Also, as the drive belt stretches, the spring's biasing effect changes, making it difficult to maintain a constant tensioning force on the drive belt. Likewise, the springs may become rusted and corroded and break during the life of the vehicle, presenting mechanical maintenance problems for the vehicle owner.

Accordingly, it is desirable to provide a belt tensioning device which eliminates the use of springs for controlling the movement of a belt-engaging idler pulley, which device will maintain a constant predetermined tension on the belt throughout the full stroke of the pulley whether the engine is on or off or being driven at high or low speeds, and which device uses the oil of the vehicle hydraulic system for operation thereof.

Many of these problems are believed to be eliminated by the improved hydraulic belt tensioner construction shown in a copending application of Nolte V. Sproul, Ser. No. 058,362, filed July 18, 1979, which is assigned to the same Assignee as is the present application. This improved belt tensioner is operated by the relatively high pressure exerted by the hydraulic fluid of the vehicle power steering pump. However, problems could be encountered with this tensioner if used with those vehicles not having a power steering mechanism and the high fluid pressure developed thereby.

The power steering pump of many vehicles produces a hydraulic pressure in the range of from 1350 to 1450 psi, whereas the lubricating system of the vehicle generally operates at a pressure of between 30 and 55 psi. Therefore, in order to develop sufficient tensioning force on a belt-engaging idler pulley by the outward movement of a piston rod, and exceedingly large, expensive and impractical cylinder and/or bellcrank lever arrangement may be required if operated by this low fluid pressure. Thus, the need exists for an improved hydraulic belt tensioner which is operated by the relatively low pressure of the vehicle lubricating system, and which will provide the necessary tensioning force on an endless belt in a compact, efficient and inexpensive manner.

There is no known belt tensioning device of which I am aware which imparts a constant predetermined tensioning force on an endless accessory drive belt by an idler pulley which is actuated entirely by the low pressure of the hydraulic fluid from the engine lubricating system without the use of any springs or similar biasing means and which maintains this constant pressure on the belt whether the engine is on or off or operating at various speeds, and which prevents belt whip and achieves a highly efficient damping effect.

SUMMARY OF THE INVENTION

Objectives of the invention include providing a hydraulic belt tensioner construction which is actuated by the low pressure fluid of the vehicle lubricating system to maintain a constant predetermined tensioning force on the endless drive belt of the vehicle accessory drive system whether the engine is on or off or operating at various speeds and conditions. Another object is to provide a belt tensioner in which the hydraulic cylinder has a check valve system which prevents the escape of hydraulic fluid from the cylinder, thereby maintaining constant pressure on the piston and providing a damping effect thereto, eliminating belt whip upon starting and stopping of the vehicle engine or upon rapid engine acceleration or deceleration. Still another object is to provide a belt tensioner which completely eliminates the use of springs or similar mechanical biasing components for imparting the belt tensioning force, which components are subject to breakage and changing operating characteristics, and in which the belt tensioner applies constant force on the belt-engaging idler pulley throughout the full stroke of the bellcrank mechanism on which the pulley is mounted. Another object is to provide a belt tensioner in which the hydraulic cylinder is provided with a pair of subchambers with spaced pressure discs being mounted on the piston rod and located within each of the subchambers to increase the force exerted on the piston rod by increasing the effective area acted upon by the hydraulic fluid, to provide a compact cylinder construction which is able to develop sufficient belt tensioning force from the low pressure of the vehicle lubricating system. Furthermore, it is an object of the invention to provide a belt tensioner which is of a relatively simple construction, which eliminates maintenance and repair problems, which achieves the stated objectives in a simple, effective and relatively inexpensive manner, and which solves problems and satisfies needs existing in the art.

These objectives and advantages are obtained by the improved hydraulic belt tensioner construction for use with the hydraulic system of a vehicle for automatically tensioning an endless belt of the drive system for the vehicle accessories, the general nature of which includes a hydraulic cylinder having a chamber formed therein and piston rod means slidably mounted in said chamber. The construction further includes a partition wall mounted in the cylinder chamber forming a pair of subchambers, a pair of discs mounted in a spaced relationship on the piston rod means with each of the respective discs being located within a respective one of the subchambers, and passage means formed in the piston rod means to provide fluid communication between the subchambers. A bellcrank is pivotally mounted on the cylinder and engageable by the piston rod means for imparting pivotal movement to the bellcrank upon actuation of said piston rod means. An idler pulley is rotatably mounted on the bellcrank and engageable with the endless belt to apply a tensioning force on the belt upon pivotal movement of the bellcrank. Means are provided which connect the cylinder to the low-pressure hydraulic lubricating system of the vehicle for supplying hydraulic fluid to the cylinder chamber for slidably moving the piston rod means into engagement with the bellcrank, and check valve means control the flow of hydraulic fluid into and out of the cylinder chamber to maintain a constant predetermined amount of fluid pressure on the piston rod means and, accordingly, on the belt.

BRIEF DESCRIPTION OF THE DRAWING

A preferred embodiment of the invention—illustrative of the best mode in which applicant has contemplated applying the principles—is set forth in the following description and shown in the accompanying drawing, and is particularly and distinctly pointed out and set forth in the appended claims.

Similar numerals refer to similar parts throughout the drawing.

DESCRIPTION OF THE PREFERRED EMBODIMENT

Figure 1:
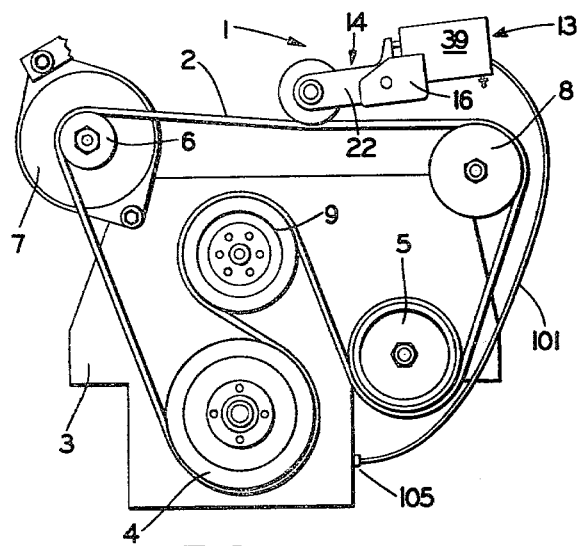
FIG. 1 is a diagrammatic view looking toward the front of an engine illustrating an endless drive belt operatively connected to and driving the vehicle accessories with the improved belt tensioner engaged therewith.
Figure 2:
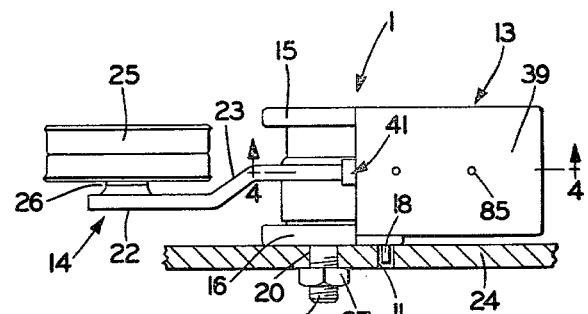
FIG. 2 is an enlarged top plan view of the improved belt tensioner of FIG. 1 mounted on a portion on an engine bracket, shown in section.
Figure 3:
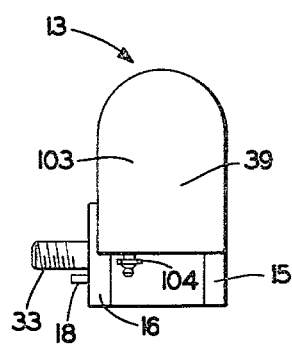
FIG. 3 is a right-hand end elevational view of the belt tensioner of FIG. 2 with the engine mounting bracket removed.

Referring to FIG. 1 of the drawing, the improved belt tensioner construction is indicated generally at 1, and is shown in tensioning engagement with an endless drive belt 2 of a power transmission belt drive system for the vehicle accessories. The drive system consists of a plurality of belt pulleys or sheaves having configurations and diameters determined by their associated engine accessory components and locations relative to each other. The various pulleys are supported on their respective engine components, which in turn are mounted on an engine 3 in a usual manner known in the art. Preferably, belt 2 operates in a single vertical plane which eliminates binding and skewing of the belt.

The engine accessories drive system consists of a main driving pulley 4 which is operatively connected to the main drive shaft of the engine, a pulley 5 which is operatively connected to the air conditioning motor, a pulley 6 which is operatively connected to an alternator 7 which provides the electrical power for the engine, a pulley 8 which is operatively connected to the engine air pump, and a pulley 9 which is operatively connected to the engine water pump.

Tensioner 1 includes as main components an improved hydraulic cylinder and a bellcrank mechanism indicated generally at 13 and 14, respectively, which are mounted on and are located between a pair of side plates 15 and 16. Cylinder 13 is mounted between side plates 15–16 by a pair of transversely extending pins 17 (FIGS. 4 and 5) whose ends are peened at 12 against the outer surfaces of side plates 15–16 to rigidly mount cylinder 13 therebetween. An engine bracket mounting pin 18 is embedded in and extends partially into cylinder 13 and through side plate 16. The extended end of pin 18 projects outwardly beyond side plate 16 and is adapted to be engaged in an alignment opening 11 formed in a mounting bracket 24, when mounting belt tensioner 1 on an engine adjacent belt 2.

Bellcrank 14 includes an integral one-piece lever member having an upstanding first lever 21 and a longer second lever 22 extending outwardly at a generally right angle with respect to first lever 21. Second lever 22 has a lateral offset section 23 and has an idler pulley 25 rotatably mounted on the outer or extended end of second lever 22 by a bearing assembly (not shown) journalled on a stub shaft 26.

The one-piece lever member preferably is formed of metal and has a generally circular-shaped portion at the junction of levers 21 and 22 and has a circular opening 28 formed therethrough. A cylindrical metal sleeve 29 is inserted through circular opening 28 and secured therein by a plurality of circumferentially spaced metal deformations 30 (FIGS. 4 and 5) or other types of fastening means, such as welding, brazing or the like. Sleeve 29 and attached bellcrank 14 are pivotally mounted between side plates 15–16 on a pivot shaft 32. Shaft 32 extends through a pair of openings formed in side plates 15–16 and is secured therein by a press fit so as to be fixed in a nonrotatable condition with respect to the side plates. Pivot shaft 32 terminates at one end in a reduced diameter threaded bolt end 33 which extends outwardly beyond side plate 16 parallel with mounting pin 18 (FIG. 5). Bolt end 33 is adapted to extend through an opening 20 in mounting bracket 24 for attaching belt tensioner 1 in a fixed position on bracket 24 adjacent endless belt 2 by a nut 27. Tensioner 1 preferably engages belt 2 at a location between pulleys 6 and 8 of alternator 7 and of the air pump, as shown in FIG. 1, although this location is not crucial for its effective operation.

A central area of pivot shaft 32 is knurled at 34 and has a sleeve of plastic material 35, such as polyurethane, force fitted thereon. Sleeve 35 retards the pivotal movement of cylindrical sleeve 29 on pivot shaft 32 to provide a damping effect to idler pulley 25, together with hydraulic fluid as described below. A pair of bushings 36 having outturned end flanges 37 formed of a low-friction material is telescopically mounted on the ends of pivot shaft 32 adjacent side plates 15–16. Bushings 36 provide a relatively low-friction cylindrical sliding surface for the internal bore of bellcrank sleeve 29 (FIG. 5) and provide a filler to prevent wobble between sleeve 29 and pivot shaft 32.

Figure 4:
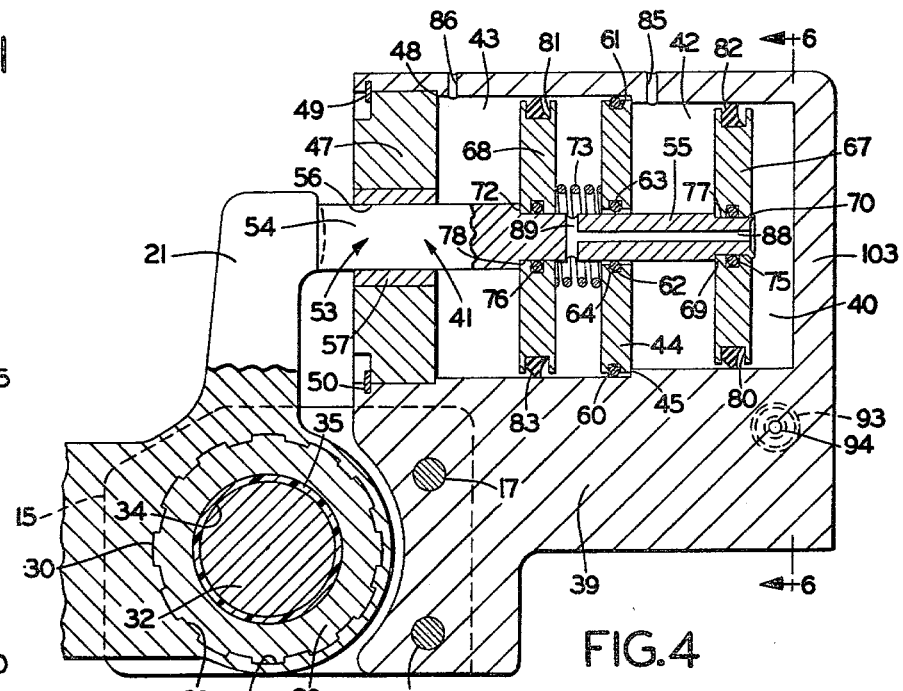
FIG. 4 is an enlarged, fragmentary sectional view taken on line 4—4, FIG. 2.
Figure 5:
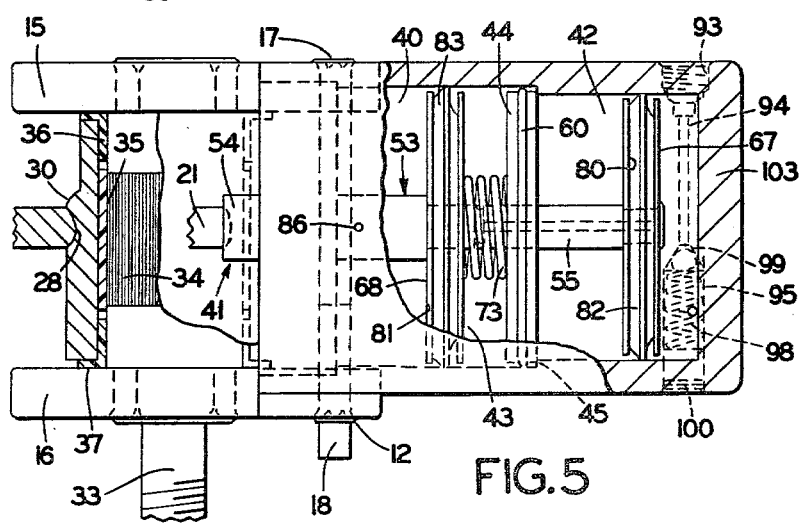
FIG. 5 is an enlarged fragmentary top plan view similar to FIG. 2, with portions broken away and in section.

In accordance with one of the main features of the invention, cylinder 13 is formed with a cylindrical-shaped chamber 40 which extends inwardly from the front of cylinder 13 and longitudinally throughout an upper portion of the cylinder body 39 (FIGS. 4 and 5). A piston, indicated generally at 41, is slidably mounted in chamber 40 for movement in response to hydraulic fluid entering chamber 40. Chamber 40 is divided into a pair of subchambers 42 and 43, designated as "rear" and "front", respectively, by a disc-shaped partition wall 44. Rear subchamber 42 has a smaller internal diameter than the internal diameter of front subchamber 43 forming an annular shoulder 45 against which partition wall 44 is abutted. Front subchamber 43 is enclosed by a disc-shaped cylinder end wall 47 which is clamped against another annular shoulder 48 by a snap ring 49 seated within an annular groove 50.

Piston 41 includes a piston rod indicated generally at 53, which has a cylindrical front portion 54 and a reduced diameter cylindrical rear portion 55. Front rod portion 54 is slidably mounted within and extends through a cylindrical bore 56 of a bushing 57 which is mounted in the center of cylinder end wall 47. A sealing O-ring 60 is mounted in an annular groove 61 formed in the periphery of partition wall 44 to provide an effective fluid seal between partition wall 44 and cylinder body 39. A second sealing O-ring 62 is mounted in an annular groove 63 which defines a circular central opening 64 formed in partition wall 44 to provide a sealing engagement with piston rod rear portion 55 which is slidably mounted therein (FIG. 4).

A pair of spaced annular discs 67 and 68 is mounted on piston rod 53 for movement therewith. Discs 67–68 are located within subchambers 42 and 43, respectively, and accordingly, are referred to as the "rear" and "front" discs. If desired, additional discs could be mounted on rod 53 and located within additional subchambers.

Rear disc 67 is mounted on the rear end of piston rod portion 55 and is clamped against an annular shoulder 69 formed thereon by flaring the end 70 of the piston rod. Front disc 68 is clamped against another annular shoulder 72 formed at the junction of rod portions 54 and 55 by a coil spring 73 located between front disc 68 and partition wall 44. A pair of inner sealing O-rings 75 and 76 is mounted within annular grooves formed in the periphery of circular holes 77 and 78, respectively. Holes 77–78 are formed through the centers of discs 67 and 68 through which piston rod rear portion 55 extends with O-rings 75–76 providing an effective fluid seal between the piston rod and mounted discs to prevent any leakage of hydraulic fluid therebetween. The outer peripheral edges of discs 67 and 68 are formed with U-shaped grooves 80 and 81, respectively, in which annular sealing rings 82 and 83 are seated. Rings 82–83 provide a sliding sealing engagement with the internal cylindrical wall portions of cylinder body 39 which define subchambers 42 and 43.

A pair of radially extending vent holes 85 and 86 (FIG. 4) is formed in the top of cylinder body 39 and communicates with the forward or air-filled portions of subchambers 42 and 43, respectively. Holes 85 and 86 provide communication between the surrounding atmosphere and the air-filled portions of the subchambers to permit air contained therein to be expelled to the atmosphere during forward movement of piston discs 67 and 68.

An axially extending bore 88 is formed throughout most of the rear piston rod portion 55 and extends from the end of rod portion 55 inwardly and communicates with a diametrically extending passage 89 which communicates with the rear or fluid-receiving portion of front subchamber 43. This liquid-receiving subchamber portion is located between partition wall 44 and piston disc 68.

Figure 6:
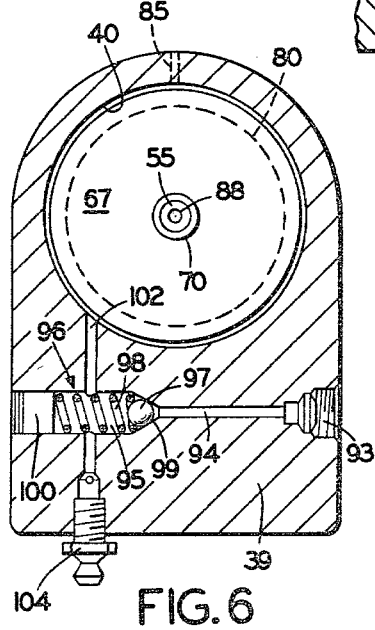
FIG. 6 is a sectional view taken on line 6—6, FIG. 4.

Cylinder body 39 is provided with a check valve system for regulating the oil or hydraulic fluid flow into and out of chamber 40 to maintain a constant predetermined force on belt 2 by means of bellcrank 14 and pulley 25, while simultaneously providing a damping shock-absorbing effect thereto. An internally threaded inlet opening 93 (FIGS. 5 and 6) is formed in the side of cylinder body 39 and communicates with a transversely extending fluid passage 94. Passage 94 terminates in a cavity 95 of a ball check valve, indicated generally at 96. Inlet opening 93 is adapted to receive an end connector (not shown) of a supply line 101, preferably formed of a flexible tube or conduit, which is connected at 105 to vehicle engine 3, as shown in FIG. 1. Check valve 96 includes a ball valve 97 which is biased by a spring 98 toward closed position in valve seat 99. A threaded plug 100 seals the outer portion of cavity 95 and engages the other end of spring 98 (FIG. 6).

Another hydraulic fluid passage 102 extends vertically through cylinder body 39 (FIG. 6) and communicates with check valve cavity 95 and with the rear or fluid-receiving portion of cylinder subchamber 42 which is located between rear disc 67 and the cylinder body back wall 103. A plug 104 seals the outer end of passage 102. Passage 102 enables air trapped within the fluid-receiving rear portions of subchambers 42 and 43 to be expelled therefrom upon the initial introduction of hydraulic fluid into chamber 40 or for bleeding hydraulic fluid therefrom when rod 53 is retracted to install a new belt or reinstall existing belt 2.

The basic operation of the improved belt tensioner 1 is as follows. The lubricating system of many vehicles produces a maximum hydraulic pressure within a predetermined range, such as from 30 to 55 psi. This pressure, which is relatively low in comparison to the pressure developed by the vehicle power steering pump, which for many vehicles operates at a pressure of approximately 1350 to 1450 psi. This engine oil flows through line 101 and into the rear of chamber 40 through passages 94 and 102 and check valve cavity 95. This low pressure is sufficient to raise ball 97 from valve seat 99, permitting the oil to flow into cavity 95. This incoming oil will flow through piston rod passages 88–89 and into the rear, liquid-receiving portion of subchamber 43 between front disc 68 and partition wall 44. After all of the trapped air, located in the rear portions of subchambers 42 and 43, has been expelled to the atmosphere through passage 102, plug 104 is secured therein to seal passage 102.

By initially determining the desired amount of downward force to be maintained on belt 2 by pulley 25 and knowing the maximum amount of hydraulic pressure which will be available in chamber 40 from the vehicle lubricating fluid, calculations can be made to determine the required diameters of piston discs 67–68. The combination of the hydraulic pressure and contacted surface area of discs 67–68 determines the outward force exerted by piston rod 53 against lever 21. The force applied to the piston rod will be the sum of the hydraulic pressure multiplied by the area of each disc, since force equals pressure times area. This outward thrust or force exerted by piston rod 53 is applied to belt 2 through the effective moment arm lengths of levers 21 and 22 of bellcrank 14 which can be varied to achieve the desired force exerted by pulley 25 on belt 2. In one particular vehicle application for which belt tensioner 1 is intended to be used, a downward force of approximately 125 lbs. is applied by pulley 25 on belt 2, and the approximate diameters of discs 67 and 68 are 50 and 54 mm, respectively, with the moment arm lengths of levers 21 and 22 being approximately 60 and 100 mm, respectively.

The hydraulic pressure which is exerted on piston discs 67 and 68 is trapped in the rear portions of subchambers 42 and 43 by check valve 96 maintaining this constant pressure on the piston rod and on pulley 25 through bellcrank 14, since the hydraulic fluid is for all purposes noncompressible. Thus, if the operating pressure of the vehicle lubricating system varies below its maximum amount and regardless of whether the vehicle engine is running or stopped, this pressure is still captured within the rear portions of subchambers 42 and 43 and is applied to piston rod 53. Any oil which may leak past sealing rings 82 and 83 will be quickly replenished upon the engine lubricating system again operating in its maximum pressure range. Due to the noncompressibility of the trapped hydraulic fluid, piston rod 53 cannot move inwardly in cylinder chamber 40, thereby preventing belt 2 from lifting pulley 25 from its tensioning position during the sudden acceleration or deceleration of the engine and possible whipping action of belt 2.

Plastic sleeve 35, which is firmly mounted on pivot shaft 32, provides a sliding engagement with the interior bore of metallic sleeve 29. The particular plastic material used for sleeve 35 (polyurethane), or similar materials, provides sufficient friction to retard, but not prevent, sliding movement between sleeves 29 and 35. Thus, when a sudden slackening or inward movement of belt 2 occurs at the point of engagement with pulley 25, sleeve 35 will prevent bellcrank 14 from moving quickly in a counterclockwise direction under the pressure exerted by piston rod 53. Thus, the particular pivotal mounting arrangement of bellcrank mechanism 14 on sleeve 35 of pivot shaft 32 in combination with the trapped hydraulic fluid, provides a shock-absorbing, damping effect to belt tensioner construction 1.

Another advantage of belt tensioner 1 is that the desired predetermined force is applied continuously by pulley 25 against belt 2 throughout the entire angular pivotal movement of lever arm 22 during the service life of belt 2. As belt 2 stretches, lever 22 will pivot in a counterclockwise direction under the urging of piston rod 53, with the rear portions of subchambers 42 and 43 filling with hydraulic fluid to compensate for and cause the pivotal movement of bellcrank 14 without changing the force applied by piston rod 53 on engaged lever end 21.

Maintenance can be performed on any of the accessories driven by belt 2 or belt 2 can be replaced easily should it become broken or excessively worn. Plug 104 is removed, enabling piston 53 to be retracted in cylinder chamber 40 with the trapped oil escaping through passage 102. Lever 22 can then be pivoted in a clockwise direction, releasing the tensioning pressure on belt 2. After the belt is reinstalled, oil is allowed to re-enter the subchambers through passages 94, 102, 88 and 89, expelling any trapped air through passage 102. Plug 104 then is installed, placing belt tensioner 1 in its usual, continuous operating condition.

One of the main advantages of the improved hydraulic belt tensioner is the use of the relatively low pressure which is developed by the vehicle lubricating system for actuation of the belt tensioner piston which has a compact size and configuration due to the unique piston rod and associated spaced disc-subchamber combination. This multiple piston disc arrangement enables the piston rod to generate sufficient force from the low pressure of the engine lubricating system to pivot bellcrank 14 and mounted pulley 25 into belt tensioning engagement. This double piston rod-disc arrangement provides sufficient area which is acted upon by the vehicle fluid to eliminate excessively long and impractical levers for bellcrank 14, and provides an improved belt tensioner for use on vehicles not equipped with a power steering mechanism and corresponding high fluid pressure.

Accordingly, the improved belt tensioner construction is simplified, provides an effective, safe, inexpensive, and efficient device which achieves all the enumerated objectives, provides for eliminating difficulties encountered with prior tensioning devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved hydraulic belt tensioning device is constructed and used, the characteristics of the construction, and the advantageous, new and useful results obtained; the new and useful structures, devices, elements, arrangements, parts and combinations are set forth in the appended claims.

I claim:

1. A hydraulic belt tensioner construction for use with the hydraulic system of a vehicle for automatically tensioning an endless belt of the drive system for the vehicle accessories, said construction including:
   (a) a hydraulic cylinder having a chamber formed therein and piston rod means slidably mounted in said chamber;
   (b) a partition wall mounted in the cylinder chamber forming a pair of subchambers;
   (c) a pair of discs mounted in a spaced relationship on the piston rod means with each of the respective discs being located within a respective one of the subchambers;
   (d) passage means formed in the piston rod means to provide fluid communication between the subchambers;
   (e) a bellcrank pivotally mounted on the cylinder and engageable by the piston rod means for imparting pivotal movement to the bellcrank upon actuation of said piston rod means;
   (f) idler pulley means rotatably mounted on the bellcrank and engageable with the endless belt to apply a tensioning force on the belt upon pivotal movement of the bellcrank;
   (g) conduit means connecting the cylinder to the low-pressure hydraulic lubricating system of the vehicle for supplying hydraulic fluid to the cylinder chamber for slidably moving the piston rod means into engagement with the bellcrank; and
   (h) check valve means controlling the flow of hydraulic fluid into and out of the cylinder chamber to maintain a constant predetermined amount of fluid pressure on the piston rod means, and accordingly, on the belt.

2. The belt tensioner construction defined in claim 1 in which spring means biases one of the discs away from the partition wall to form a hydraulic fluid-receiving portion of one of the subchambers therebetween.

3. The belt tensioner construction defined in claim 1 in which the piston rod means has first and second cylindrical portions of different diameters forming an annular shoulder therebetween; in which a coil spring is telescopically mounted on the smaller cylindrical portion and is located between the partition wall and one of the discs biasing said one disc into abutting relationship with the annular shoulder.

4. The belt tensioner construction defined in claim 1 in which each of the subchambers is divided into a rear fluid-receiving portion and a front portion by the respective discs; and in which holes are formed in the cylinder and communicate with the front portion of each subchamber and the surrounding atmosphere.

5. The belt tensioner construction defined in claim 4 in which the piston rod means passage means includes an axial bore communicating with and extending between the fluid-receiving portions of the subchambers.

6. The belt tensioner construction defined in claim 1 in which the check valve means is a spring biased ball check valve formed in the hydraulic cylinder and located between the cylinder chamber and conduit means.

7. The belt tensioner construction defined in claim 6 in which purge valve means is formed in the hydraulic cylinder and communicates with the cylinder chamber for purging of trapped air and hydraulic fluid from the said chamber.

8. In an improved hydraulic belt tensioner construction for use with the hydraulic system of a vehicle for automatically tensioning an endless belt of the drive system for the vehicle accessories, said tensioner being of the type having a hydraulic cylinder with a piston rod slidably mounted within a chamber formed in the cylinder, in which the piston rod actuates one end of a bellcrank to pivot an idler pulley which is rotatably mounted on the other end of the bellcrank into tensioning engagement with the vehicle accessories drive belt, in which the cylinder is connected to the low-pressure hydraulic system of the vehicle for supplying hydraulic fluid to the cylinder chamber for slidably moving the piston rod out of the chamber and into engagement with the bellcrank mechanism, and in which check valve means controls the flow of hydraulic fluid into and out of the cylinder to maintain a constant, predetermined amount of fluid pressure on the piston rod, wherein the improvement includes:
   (a) a partition wall mounted in the cylinder chamber forming a pair of subchambers;
   (b) a pair of discs mounted in a spaced front and rear relationship on the piston rod for movement with said rod, with each disc being located within a respective one of the subchambers; and
   (c) passage means formed in the piston rod providing fluid communication between the subchambers and hydraulic system of the vehicle whereby hydraulic fluid supplied to the chamber flows into and is maintained in each subchamber applying hydraulic pressure to the pair of discs for maintaining a constant, predetermined force on the belt-engaging idler pulley.

9. The belt tensioner construction defined in claim 8 in which a pair of air vent holes is formed in the cylinder and communicates with a respective subchamber for expelling air from a front portion of each subchamber as the piston rod and attached discs move forwardly in the subchambers.

10. The belt tensioner construction defined in claim 8 in which a coil spring is telescopically mounted on the piston rod and engages the partition wall and front disc to bias said front disc away from the partition wall to form a fluid receiving portion therebetween.

11. The belt tensioner construction defined in claim 8 in which the rear subchamber has a smaller diameter than the forward subchamber forming an annular shoulder therebetween; and in which the partition wall is in abutting engagement with said shoulder.

12. The belt tensioner construction defined in claim 8 in which annular sealing rings are mounted on the peripheries of the piston discs to provide a sliding fluid sealing engagement with the cylinder.

13. The belt tensioner construction defined in claim 8 in which the check valve means includes an inlet port adapted to be operatively connected to the low-pressure hydraulic system, a cavity having a spring-biased ball valve movably mounted therein, and a passage extending between and communicating with the cavity and rear of the cylinder chamber; and in which the ball valve permits the flow of hydraulic fluid in only one direction from the inlet port into the cavity for discharge into the cylinder.

14. The belt tensioner construction defined in claim 13 in which a second passage is formed in the cylinder and communicates with the cylinder chamber and surrounding atmosphere to provide for removal of trapped air and hydraulic fluid from the subchambers; and in which removable closure means is mounted on the cylinder to selectively close the second passage.

* * * * *